US012580193B2

(12) United States Patent (10) Patent No.: US 12,580,193 B2

Kang et al. (45) Date of Patent: **\*Mar. 17, 2026**

(54) METHOD FOR PREPARING POROUS CARBON MATERIAL, AND SULFUR-CARBON COMPOSITE AND LITHIUM-SULFUR BATTERY INCLUDING THE SAME

(71) Applicant: LG ENERGY SOLUTION, LTD., Seoul (KR)

(72) Inventors: Da-Young Kang, Daejeon (KR); Min-Su Kim, Daejeon (KR); Bong-Soo Kim, Daejeon (KR); Seung-Bo Yang, Daejeon (KR)

(73) Assignee: LG Energy Solution, Ltd., Seoul (KR)

( \* ) Notice: Subject to any disclaimer, the term of this patent is extended or adjusted under 35 U.S.C. 154(b) by 0 days.

This patent is subject to a terminal disclaimer.

(21) Appl. No.: 18/243,937

(22) Filed: Sep. 8, 2023

(65) Prior Publication Data

US 2024/0178390 A1 May 30, 2024

(51) Int. Cl.
*H01M 4/58* (2010.01)
*C01B 32/172* (2017.01)
(Continued)

(52) U.S. Cl.
CPC ......... *H01M 4/5815* (2013.01); *C01B 32/172* (2017.08); *C01B 32/178* (2017.08);
(Continued)

(58) Field of Classification Search
CPC ...... H01M 4/583; H01M 4/366; H01M 4/362; H01M 4/364; H01M 4/38; H01M 4/581;
(Continued)

(56) References Cited

U.S. PATENT DOCUMENTS

2003/0113624 A1    6/2003  Kim et al.
2009/0214954 A1\*  8/2009  Onishi ................ H01M 4/0435
                                                                        429/231.8
(Continued)

FOREIGN PATENT DOCUMENTS

CN          108630926 A      10/2018
CN          110247047 A       9/2019
(Continued)

OTHER PUBLICATIONS

Ultra Centrifugal Mill ZM 200, Feb. 29, 2014, Retsch, pp. 1 and 3 (Year: 2014).\*

(Continued)

*Primary Examiner* — Jonathan G Leong
*Assistant Examiner* — John S Medley
(74) *Attorney, Agent, or Firm* — Bryan Cave Leighton Paisner LLP

(57) ABSTRACT

The present disclosure relates to a method for preparing a porous carbon material including: (1) a step of centrifugally milling a porous carbon material; and (2) a step of filtering the centrifugally milled porous carbon material through a sieve, wherein a mesh size of the sieve is 2.8 to 4 times of a $D_{50}$ particle size of the porous carbon material filtered through the sieve in the step (2). The present disclosure also relates to a porous carbon material prepared by the above-described method, a sulfur-carbon composite and a lithium-sulfur battery including the porous carbon material prepared by the above-described method.

11 Claims, 4 Drawing Sheets

(51) Int. Cl.

| | |
|---|---|
| *C01B 32/178* | (2017.01) |
| *H01M 4/133* | (2010.01) |
| *H01M 4/136* | (2010.01) |
| *H01M 4/36* | (2006.01) |
| *H01M 4/38* | (2006.01) |
| *H01M 4/583* | (2010.01) |
| *H01M 4/60* | (2006.01) |
| *H01M 4/62* | (2006.01) |
| *H01M 10/052* | (2010.01) |
| *H01M 4/02* | (2006.01) |

(52) U.S. Cl.

CPC ........... *H01M 4/133* (2013.01); *H01M 4/136* (2013.01); *H01M 4/366* (2013.01); *H01M 4/38* (2013.01); *H01M 4/583* (2013.01); *H01M 4/60* (2013.01); *H01M 4/622* (2013.01); *H01M 10/052* (2013.01); *C01B 2202/06* (2013.01); *C01B 2202/22* (2013.01); *C01B 2202/36* (2013.01); *C01P 2004/03* (2013.01); *C01P 2006/40* (2013.01); *H01M 2004/021* (2013.01); *H01M 2004/028* (2013.01)

(58) Field of Classification Search

CPC ............... H01M 4/60; H01M 10/0585; H01M 10/0525; C01B 32/172; C01B 32/178

USPC ......................................................... 429/213

See application file for complete search history.

(56) References Cited

U.S. PATENT DOCUMENTS

| | | | |
|---|---|---|---|
| 2012/0177923 A1 | 7/2012 | Kumara | |
| 2014/0255292 A1 | 9/2014 | Wakizaka et al. | |
| 2016/0248087 A1 | 8/2016 | Kim et al. | |
| 2017/0263924 A1* | 9/2017 | Otter .................... | H01M 4/625 |
| 2017/0352873 A1* | 12/2017 | Korzhenko ......... | H01M 4/5815 |
| 2018/0219212 A1* | 8/2018 | Seol ..................... | H01M 4/364 |
| 2019/0123377 A1 | 4/2019 | Yang et al. | |
| 2020/0220169 A1 | 7/2020 | Kim et al. | |
| 2020/0350560 A1 | 11/2020 | Korzhenko et al. | |
| 2021/0028452 A1* | 1/2021 | Su ......................... | H01M 4/623 |
| 2021/0119210 A1 | 4/2021 | Korzhenko et al. | |
| 2021/0143406 A1 | 5/2021 | Cho et al. | |
| 2021/0143407 A1 | 5/2021 | Cho et al. | |
| 2021/0399294 A1 | 12/2021 | Cho et al. | |
| 2022/0231342 A1 | 7/2022 | Song | |
| 2022/0293952 A1 | 9/2022 | Brown | |
| 2022/0367873 A1 | 11/2022 | Ahn et al. | |

FOREIGN PATENT DOCUMENTS

| | | | | |
|---|---|---|---|---|
| CN | 113233451 A | | 8/2021 | |
| CN | 111799459 B | * | 9/2021 | .......... H01M 10/052 |
| CN | 114551846 A | | 5/2022 | |
| EP | 3667779 A2 | | 6/2020 | |
| EP | 4451379 A1 | | 10/2024 | |
| JP | 10-286479 A | | 10/1998 | |
| JP | 11-102702 A | | 4/1999 | |
| JP | 2006-274189 A | | 10/2006 | |
| JP | 2015-180507 A | | 10/2015 | |
| JP | 2016-91638 A | | 5/2016 | |
| JP | 2017-010651 A | | 1/2017 | |
| JP | 2017-62898 A | | 3/2017 | |
| JP | 2017108022 A | | 6/2017 | |
| JP | 2022-517022 A | | 3/2022 | |
| JP | 2022518681 A | | 3/2022 | |
| JP | 2022544392 A | | 10/2022 | |
| KR | 10-2015-0014793 A | | 2/2015 | |
| KR | 10-2015-0045363 A | | 4/2015 | |
| KR | 10-2016-0037084 A | | 4/2016 | |
| KR | 10-2017-0049080 A | | 5/2017 | |
| KR | 10-1737217 B1 | | 5/2017 | |
| KR | 1020180102406 A | | 9/2018 | |
| KR | 10-2019-0056484 A | | 5/2019 | |
| KR | 10-2019-0060262 A | | 6/2019 | |
| KR | 10-2019-0076780 A | | 7/2019 | |
| KR | 1020200032841 A | | 3/2020 | |
| KR | 10-2020-0036253 A | | 4/2020 | |
| KR | 1020200050583 A | | 5/2020 | |
| KR | 10-2020-0095549 A | | 8/2020 | |
| KR | 1020200100962 A | | 8/2020 | |
| KR | 10-2020-0113979 A | | 10/2020 | |
| KR | 10-2020-0139818 A | | 12/2020 | |
| KR | 10-2020-0144719 A | | 12/2020 | |
| KR | 1020210009272 A | | 1/2021 | |
| KR | 1020210024581 A | | 3/2021 | |
| KR | 1020210088025 A | | 7/2021 | |
| KR | 10-2022-0141023 A | | 10/2022 | |
| WO | 2020002550 A1 | | 1/2020 | |
| WO | 2020032454 A1 | | 2/2020 | |
| WO | WO-2021002385 A1 | * | 1/2021 | ........ H01M 10/0525 |
| WO | 2021028619 A1 | | 2/2021 | |
| WO | 2022-181447 A | | 9/2022 | |

OTHER PUBLICATIONS

Retsch: "Retsch General Catalogue", Feb. 1, 2020 (Feb. 1, 2020), pp. 1-132, XP093153963, Haan GermanyRetrieved from the Internet : URL :https://www.retsch.com/files/14586/general-catalogue.pdf [retrieved on Apr. 19, 2024] pp. 20-23.

Ning Ding et al. (2014), "Key parameters in design of lithium sulfur batteries," Journal of Power Sources 269 (2014) pp. 111-116.

* cited by examiner

METHOD FOR PREPARING POROUS CARBON MATERIAL, AND SULFUR-CARBON COMPOSITE AND LITHIUM-SULFUR BATTERY INCLUDING THE SAME

CROSS-REFERENCE TO RELATED APPLICATIONS

This application claims the benefit of and priority to Korean Patent Application No. 10-2022-0159965, filed on Nov. 25, 2022, Korean Patent Application No. 10-2022-0183586, filed on Dec. 23, 2022, Korean Patent Application No. 10-2022-0183771, filed on Dec. 23, 2022, Korean Patent Application No. 10-2022-0185613, filed on Dec. 27, 2022, Korean Patent Application No. 10-2023-0063394, filed on May 16, 2023, Korean Patent Application No. 10-2023-0070299, filed on May 31, 2023, Korean Patent Application No. 10-2023-0073163, filed on Jun. 7, 2023, and Korean Patent Application No. 10-2023-0075765, filed on Jun. 13, 2023, the disclosures of which are incorporated herein by reference in their entirety.

TECHNICAL FIELD

The present disclosure relates to a method for preparing a porous carbon material having a controlled particle size. The present disclosure also relates to a porous carbon material prepared by the method, and a sulfur-carbon composite and a lithium-sulfur battery including the porous carbon material.

BACKGROUND

Recently, interest in energy storage technology is increasing. Efforts in the research and development of electrochemical devices are being embodied gradually as the field of application expands to mobile phones, camcorders, notebook PCs and even electric vehicles.

Among the various fields, electrochemical devices have received the most attention. Particularly, the development of secondary batteries capable of being charged and discharged has become a focus of attention. Research and development on the design of new electrodes and batteries are currently being conducted in order to improve capacity density and energy efficiency.

Among the secondary batteries currently in use, the lithium secondary battery, developed in the early 1990s, is advantageous due to its high operating voltage and remarkably high energy density compared to the conventional batteries using aqueous solution electrolytes, such as Ni-MH, Ni—Cd and sulfate-lead batteries.

In particular, the lithium-sulfur (Li—S) battery is a secondary battery which uses a sulfur-based material having an S—S(sulfur-sulfur) bond as a positive electrode active material and uses lithium metal as a negative electrode active material. Sulfur, which is the main material of the positive electrode active material, has the advantage of being very abundant and nontoxic, and having a small weight per atom. In addition, since the lithium-sulfur battery has a theoretical discharge capacity of 1675 mAh/g-sulfur and a very high theoretical energy density of 2,600 Wh/kg as compared to other battery systems currently being studied (Ni-MH battery: 450 Wh/kg, Li—FeS battery: 480 Wh/kg, Li—MnO$_2$ battery: 1,000 Wh/kg, Na—S battery: 800 Wh/kg), it is the most promising battery among the batteries that have been developed so far.

During the discharge of the lithium-sulfur battery, oxidation of lithium occurs at a negative electrode and reduction of sulfur occurs at a positive electrode. Sulfur has a cyclic S$_8$ structure before the discharge. During the reduction reaction (discharge), the oxidation number of S is decreased as the S—S bond is broken. During the oxidation reaction (charge), the oxidation number of S is increased as the S—S bond is formed again. Through this oxidation-reduction reaction, electrical energy is generated and stored. During this reaction, sulfur is converted from the cyclic S$_8$ to lithium polysulfide (Li$_2$S$_x$, $1 \leq x \leq 8$) having a linear structure through reduction. If the lithium polysulfide is reduced completely, lithium sulfide (Li$_2$S) is formed finally. The lithium-sulfur battery exhibits a discharge behavior characterized by a stepwise discharge voltage unlike the lithium-ion battery due to the reduction to lithium polysulfide.

In order to achieve commercially viable levels of energy density and lifetime characteristics for the lithium-sulfur battery, various technologies have been proposed to improve the electrochemical reactivity and stability of the positive electrode active material, i.e. a sulfur-carbon composite.

In order to improve the performance of the lithium-sulfur battery, it is crucial to maximize the reactivity of the positive electrode active material. Since sulfur used as the positive electrode active material of the lithium-sulfur battery has no conductivity, a carbon material is used as a support to maximize reactivity. Usually, a sulfur-carbon composite, wherein the carbon material is mixed with sulfur, is used.

However, when a carbon material having a large specific surface area and a high porosity is used as a support for sulfur, the particle size of the carbon material needs to be controlled to have a narrow particle size distribution because the particle size of the carbon material greatly affects the discharge capacity and energy density of the lithium-sulfur battery.

Conventionally, the carbon material has been pulverized to control its particle size. However, there is a problem that the particle size distribution is broad because large-sized particles and small-sized particles exist together.

Accordingly, there is a need to develop a method for controlling the particle size of a porous carbon material to achieve a narrow particle size distribution.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

The present disclosure is directed to providing a method for controlling the particle size of a porous carbon material, which enables the preparation of particles with a small particle size distribution and a desired D$_{50}$ particle size with high productivity through a continuous process.

In an aspect, the present disclosure provides a method for preparing a porous carbon material with a controlled particle size according to the following exemplary embodiments.

A method for preparing a porous carbon material according to a first exemplary embodiment includes:

(1) a step of centrifugally milling a porous carbon material; and (2) a step of filtering the centrifugally milled porous carbon material through a sieve, wherein a mesh size of the sieve is 2.8 to 4 times of a $D_{50}$ particle size of the porous carbon material filtered through the sieve in the step (2).

According to a second exemplary embodiment, in the first exemplary embodiment, the step (1) may include a process of centrifugally milling the porous carbon material at 6,000-23,000 rpm.

According to a third exemplary embodiment, in the first or second exemplary embodiment, the method may further include:

(3) a step of collecting the porous carbon material which passed through the sieve after the step (2).

According to a fourth exemplary embodiment, in any of the first to third exemplary embodiments, the step (1) and the step (2) may be performed by utilizing a centrifugal mill including the sieve and a plurality of rotating teeth, and wherein, in the step (1), the porous carbon material may be milled by contacting the plurality of rotating teeth in the centrifugal mill.

According to a fifth exemplary embodiment, in the fourth exemplary embodiments, an angular velocity of the rotating teeth may be 30 to 125 rad/s.

According to a sixth exemplary embodiment, in any of the first to fifth exemplary embodiments, the step (2) may be performed while a centrifugal force is applied to the porous carbon material.

According to a seventh exemplary embodiment, in any of the first to sixth exemplary embodiments, the porous carbon material may comprise one or more selected from the group consisting of carbon nanotube, carbon black, carbon nanofiber, graphene, graphite and activated carbon.

According to an eighth exemplary embodiment, in any of the first to seventh exemplary embodiments, the porous carbon material filtered through the sieve in the step (2) may have a broadness factor (BF) of 7 or lower, and wherein the broadness factor (BF) satisfies Equation 1:

Broadness factor (BF)=(particle size $D_{90}$ of the porous carbon material after the step (2))/(particle size $D_{10}$ of the porous carbon material after the step (2)). [Equation 1]

According to a ninth exemplary embodiment, in any of the first to eighth exemplary embodiments, a $D_{10}$ to $D_{50}$ particle size standard deviation of the porous carbon material filtered through the sieve in the step (2) may be 1.5 μm or smaller.

According to a tenth exemplary embodiment, in any of the first to ninth exemplary embodiments, the $D_{50}$ particle size of the porous carbon material filtered through the sieve in the step (2) may be 100 μm or smaller.

According to an eleventh exemplary embodiment, in any of the first to tenth exemplary embodiments, the tap density of the porous carbon material filtered through the sieve in the step (2) may be the same as or lower than the tap density of the porous carbon material before performing centrifugal milling in the step (1), wherein the tap density is measured after tapping a vessel containing the porous carbon material 1000 times.

According to a twelfth exemplary embodiment, in any of the first to eleventh exemplary embodiments, the steps (1) and (2) may be performed at the same time.

In another aspect of the present disclosure, there are provided a sulfur-carbon composite and a lithium-sulfur battery according to the following exemplary embodiments.

According to a thirteenth exemplary embodiment, there is provided a sulfur-carbon composite including: a porous carbon material prepared according to any of the first to twelfth exemplary embodiments; and a sulfur-based material loaded onto all or at least some of inner pores and outer surfaces of the porous carbon material.

According to a fourteenth exemplary embodiment, there is provided a lithium-sulfur battery including: a positive electrode including the sulfur-carbon composite according to the thirteenth exemplary embodiment; a negative electrode; a separator disposed between the positive electrode and the negative electrode; and an electrolyte.

In another aspect of the present disclosure, there is provided a porous carbon material according to the following exemplary embodiments.

According to a fifteenth exemplary embodiment, there is provided a porous carbon material prepared by any of the first to twelfth exemplary embodiments, wherein the porous carbon material may comprise one or more selected from the group consisting of carbon nanotube, carbon black, carbon nanofiber, graphene, graphite and activated carbon, wherein the porous carbon material may have a broadness factor (BF) of 7 or lower, and wherein the broadness factor (BF) satisfies Equation 2:

Broadness factor (BF)=(particle size $D_{90}$ of the porous carbon material)/(particle size $D_{10}$ of the porous carbon material). [Equation 2]

According to a sixteenth exemplary embodiment, in the fifteenth exemplary embodiments, a $D_{10}$ to $D_{50}$ particle size standard deviation of the porous carbon material may be 1.5 μm or smaller.

According to a seventeenth exemplary embodiment, in any of the fifteenth or sixteenth exemplary embodiments, the $D_{50}$ particle size of the porous carbon material may be 100 μm or smaller.

A method for controlling the particle size of a porous carbon material of the present disclosure provides the advantageous effects that a porous carbon material with a desired particle size and a narrow particle size distribution can be prepared through a continuous process economically in short processing time with high productivity.

In addition, when sulfur ($S_8$) is supported using the porous carbon material with a controlled particle size according to the present disclosure as an active material of a lithium-sulfur battery, it is advantageous in that the electrochemical performance of the lithium-sulfur battery is improved since the degree of utilization of sulfur is increased, although the effect of the present disclosure is not limited thereto.

DETAILED DESCRIPTION

Figure 1:
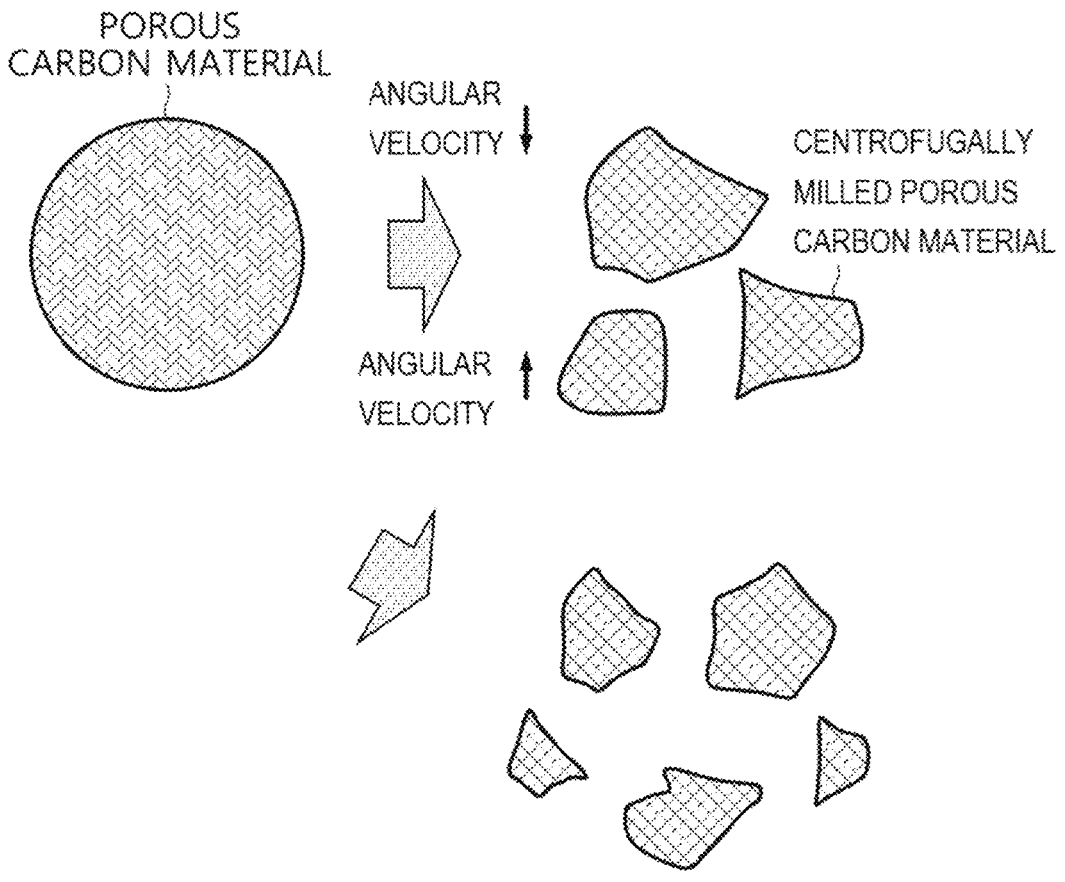
FIG. 1 schematically illustrates the centrifugal milling of a porous carbon material.

Hereinafter, the present disclosure is described in more detail.

The terms or words used in the present disclosure and claims should not be construed as being limited to their ordinary or dictionary meanings, and should be interpreted as meanings and concepts consistent with the technical idea of the present disclosure based on the principle that an inventor may properly define the concept of terms to best explain his/her invention.

The term "composite" used in the present specification refers to a material in which two or more materials are combined to form physically or chemically different phases and which exhibits more effective functions.

In the present disclosure, the "particle size $D_{10}$" refers to the particle size on the basis of 10% in the volume-cumulative particle size distribution of the particles to be measured, the "particle size $D_{50}$" refers to the particle size on the basis of 50% in the volume-cumulative particle size distribution of the particles to be measured, and the "particle size $D_{90}$" refers to the particle size on the basis of 90% in the volume-cumulative particle size distribution of the particles to be measured.

The particle sizes $D_{10}$, $D_{50}$ and $D_{90}$ may be measured by the laser diffraction method. For example, after dispersing the particles to be measured in a dispersion medium and irradiating ultrasonic waves of about 28 kHz with an output of 60 W, a volume-cumulative particle size distribution may be obtained using a commercially available laser diffraction particle size analyzer (e.g., Microtrac MT 3000) and the particle size corresponding to 10%, 50% and 90% in the volume-cumulative distribution may be determined. That is, for example, the average diameter $D_{50}$ represents the median value or median diameter in the particle size distribution graph, and it indicates the particle size at the 50% point on the cumulative distribution. Diameter represents the size of particles and particle diameter refers to the longest length within a particle.

The term "porosity" used in the present specification refers to the ratio of the volume of pores to the total volume of a structure, in vol % unit, and may be used interchangeably with the term pore ratio. The porosity can be measured according to the method specified in ISO 15901:2019.

The present disclosure relates to a method for controlling the particle size of a porous carbon material, which includes:

(1) a step of centrifugally milling a porous carbon material; and (2) a step of filtering the centrifugally milled porous carbon material through a sieve, wherein the mesh size of the sieve is 2.8 to 4 times of a $D_{50}$ particle size of the porous carbon material filtered through the sieve in the step (2), or the target $D_{50}$ particle size.

The step (1) is a step in which the porous carbon material is centrifugally milled. In the present disclosure, the process of grinding using a centrifugal mill may be referred to as 'centrifugal milling.'

The porous carbon material includes irregular pores therein. The average diameter of the pores may be 1-200 nm and the porosity may be 10-90 vol % of the total volume of the porous carbon material. The average diameter of the pores can be measured using various methods, such as gas adsorption through the BET measurement technique or mercury intrusion porosimetry, as well known in the art.

The shape of the porous carbon material is not limited and may be spherical, rod-shaped, needle-shaped, plate-shaped, tube-shaped or bulk-type.

The porous carbon material is not specially limited as long as it has a porous structure and a large specific surface area. For example, it may include one or more selected from a group consisting of carbon nanotube, carbon black, carbon nanofiber, graphene, graphite and activated carbon, specifically carbon nanotube. The porous carbon material prepared according to one aspect of the present disclosure involves controlling the particle size and/or uniformity of particle size distribution of the porous carbon material.

The carbon nanotube may include one or more selected from a group consisting of single-walled carbon nanotube and multi-walled carbon nanotube, although not being limited thereto. The carbon nanotubes may include entangled carbon nanotubes. The method according to one aspect of the present disclosure may not cause chemical alteration of the porous carbon material during the milling process and/or the sieving process. For example, in the above-described method, when utilizing multi-walled carbon nanotubes as the starting material, the porous carbon nanotubes may not by changed into single-walled carbon nanotubes or similar forms.

The carbon black may include one or more selected from the group consisting of DENKA black, acetylene black, ketjenblack, channel black, furnace black, lamp black and thermal black, although not being limited thereto.

The carbon nanofiber may include one or more selected from a group consisting of graphite nanofiber, carbon nanofiber and activated carbon fiber, although not being limited thereto.

The graphite may include one or more selected from a group consisting of natural graphite, artificial graphite and expandable graphite, although not being limited thereto.

Conventionally, the porous carbon material has been pulverized using a ball mill, a blade, etc. in order to control the particle size of the porous carbon material. However, the conventional pulverization method has the problem that a porous carbon material with a large particle size and a porous carbon material with a small particle size exist together as the porous carbon material contacts with the ball or the blade randomly, resulting in a broad particle size distribution.

Figure 2:
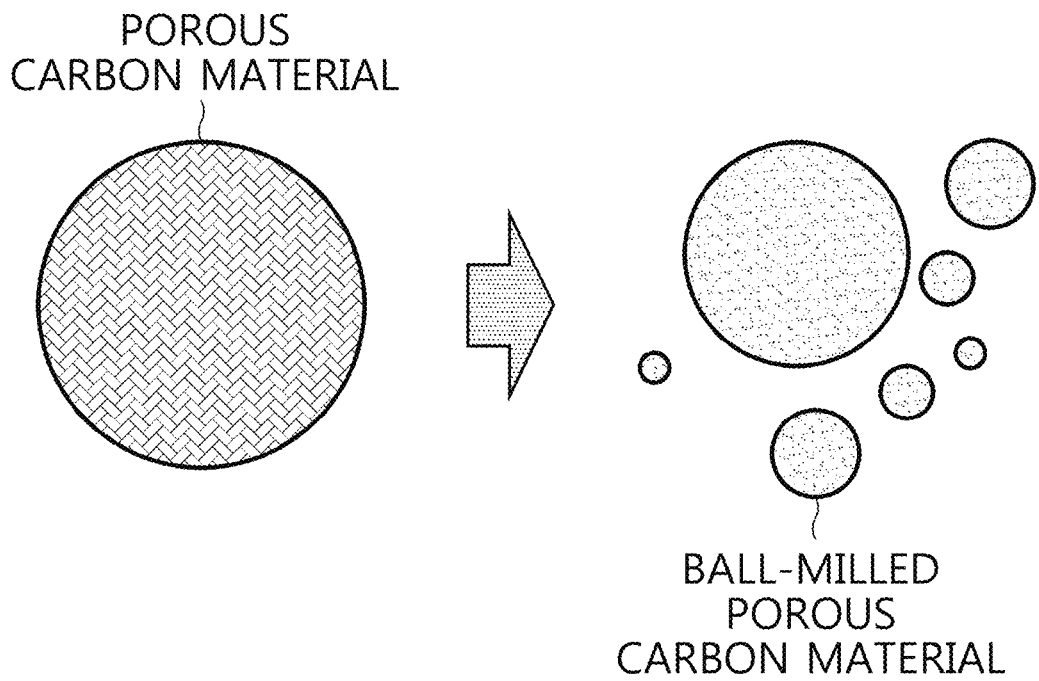
FIG. 2 schematically illustrates the pulverization of a porous carbon material with a ball mill.

Furthermore, referring to FIGS. 1 and 2, the porous carbon material according to the present disclosure are milled to control the particle size by centrifugal milling and then filtered through the sieve, so that additional abrasion of the surface of the particles or additional pulverization of the particle size is prevented. On the other hand, if the porous carbon material is pulverized by a ball mill or the like but not sieved through a sieve, the particles introduced into the ball mill are continuously pulverized or the surface is abraded, resulting in a high amount of fine powder and a high tap density. In the present disclosure, after the porous carbon material has been centrifugally milled, the step (2) of filtering the centrifugally milled porous carbon material through a sieve may be performed. Therefore, for the centrifugally milled porous carbon material to pass through the sieve, almost all the porous carbon material introduced into the centrifugal mill should be pulverized by contacting with the rotating teeth (blades) of the centrifugal mill. If the particle size becomes small enough to pass through the sieve, the centrifugally milled porous carbon material passes through the sieve without further milling. As a result, the porous carbon material contacts with the rotating teeth of the centrifugal mill with the minimum number of times and, accordingly, the fine powder generation rate may be very low and the particle size distribution may become very narrow. In the present disclosure, the fine powder means that the particle size is 6 μm or smaller. The particle size of the fine powder may mean the $D_{50}$ particle size.

In addition, since the porous carbon material is centrifugally milled as if tearing, the centrifugally milled porous carbon material may have a non-spherical shape. For example, the porous carbon material may have angular particle shapes. Specifically, the porous carbon material may have a particle shape of prismatic sphericity, such as polyhedral or prismoidal shapes.

Figure 6:
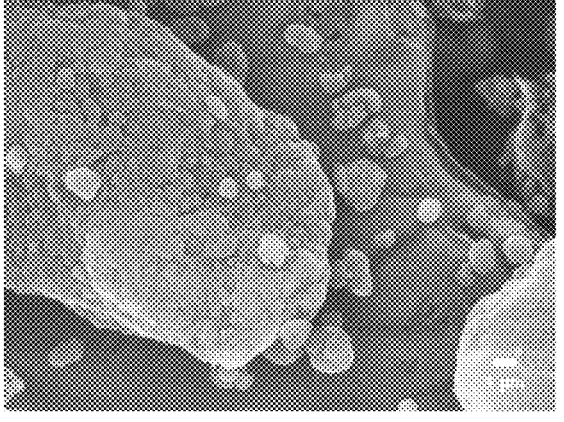
FIG. 6 is a SEM image (left) showing that the surface of the porous carbon material of Comparative Example 2 is relatively flat and a SEM image (right) showing that the surface of the porous carbon material of Example 1 is relatively rough.
Figure 6:
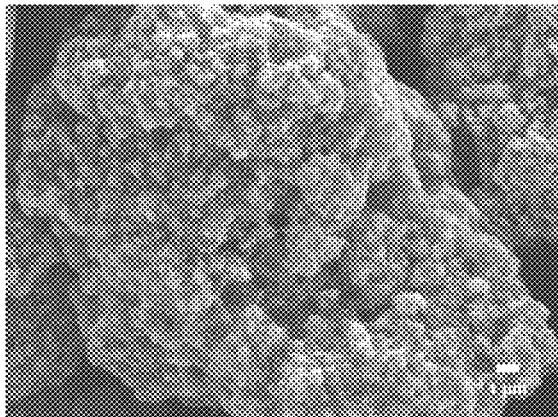

Referring to FIG. 6, it is confirmed that the surface (left side) of the porous carbon material milled by a jet mill or the like is relatively flat, whereas the surface (right side) of the porous carbon material milled by a centrifugal mill is relatively rough. It is confirmed that the porous carbon material on the right has an angular particle shape due to the rough surface characteristics.

In one embodiment of the present disclosure, the step (1) may be performed by utilizing a centrifugal mill including the sieve and a plurality of rotating teeth, and in the step (1), the porous carbon material is milled by contacting the plurality of rotating teeth in the centrifugal mill. The rotating teeth may have an angular velocity of 30 to 125 rad/s. Preferably, the rotating teeth can have an angular velocity of 30 to 95 rad/s. When the centrifugal milling speed in step (1) is within the aforementioned range, it can be advantageous in terms of finely and uniformly controlling the particle size of the porous carbon material while not increasing tap density.

Figure 3:
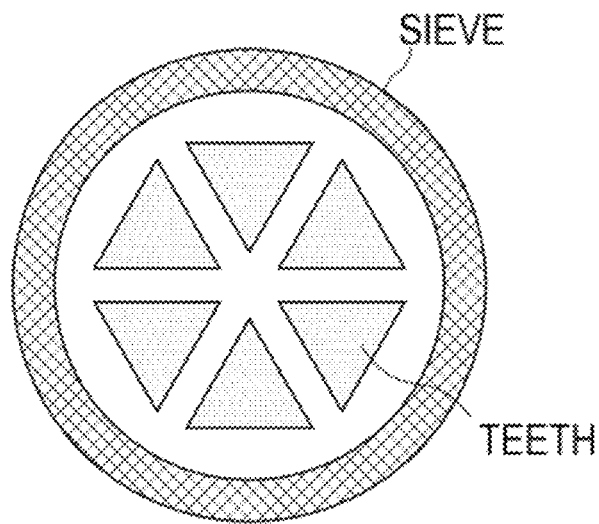
FIG. 3 schematically illustrates the cross section of a centrifugal mill.

The centrifugal mill, for example, may include 2 to 20, 4 to 18, 6 to 16, 8 to 14, 10 to 14, or 10 to 12 rotating teeth. Furthermore, in one embodiment of the present disclosure, each of the plurality of the rotating teeth can have a shape of a triangular prism. The plurality of rotating teeth can be arranged to face the rotation axis of the centrifugal mill. Specifically, when viewed from the top of the centrifugal mill, the plurality of rotating teeth can be arranged such that an edge of each of the triangular prisms faces the center of the centrifugal mill as shown in FIG. 3.

In one embodiment of the present disclosure, the plurality of rotating teeth can be made of materials such as stainless steel, titanium, or stainless steel with protective coatings. However, this is not limited thereto.

The centrifugal milling may be performed at 6,000-23,000 rpm for the control of the particle size of the porous carbon material. Specifically, the centrifugal milling can be performed using Retsch ZM 200 device at speeds ranging from 6,000 to 23,000 rpm, preferably at speeds of 6,000 to 18,000 rpm.

In one embodiment of the present disclosure, considering that the force applied can vary with the size of the centrifugal mill even at the same RPM, it's possible to adjust the RPM to achieve grinding at angular velocities between 30 and 125 rad/s according to the formula below, taking into account the size of the centrifugal grinder:

$$\text{Angular Velocity (rad/s)} = (\text{RPM} \times \text{Circumference})/60 \text{ seconds}$$

In the formula above, 'Circumference' represents the distance traveled during one rotation of a rotating tooth. The step (2) is a step in which the porous carbon material centrifugally milled in the step (1) is filtered through a sieve. The sieve may be equipped on an outer rim of the centrifugal mill. Specifically, the sieve can be equipped to surround the plurality of rotating teeth within the centrifugal mill. In one embodiment of the present disclosure, the sieve can have a cylindrical shape and be arranged around the plurality of rotating teeth. For example, from the top view of the centrifugal mill, the shortest distance between the plurality of rotating teeth and the sieve can be 0.1 to 5 mm, 0.5 to 2 mm, or 0.7 mm to 1.2 mm, or such as 1 mm. The sieve can include a mesh with trapezoidal and/or circular holes.

In one embodiment of the present disclosure, as the teeth rotate, the porous carbon material is milled by contacting the rotating teeth and the porous carbon material with controlled particle sizes can pass the sieve immediately while a centrifugal force is applied. Therefore, the issues of further reducing particle size and/or damaging the surface can be prevented. According to one aspect of the present disclosure, performing steps (1) and (2) simultaneously can achieve controlled particle diameter and obtain porous carbon material with a narrow particle size distribution.

In this manner, in one embodiment of the present disclosure, it may be advantageous for step (2) to be performed with centrifugal force applied to the porous carbon material.

In the step (2), the porous carbon material centrifugally milled in the step (1) is transferred to and filtered through a sieve. The steps (1) and (2) may be performed by a continuous process. That is to say, in the step (2), the porous carbon material centrifugally milled in the step (1) is not separately collected and added to the sieve. Specifically, the porous carbon material is centrifugally milled and the centrifugally milled porous carbon material may move to the sieve due to the applied centrifugal force. It is then filtered as it passes through the sieve if it has a particle size small enough to pass through the sieve. That is, the centrifugal milling in the step (1) and the filtration through the sieve in the step (2) may be performed at the same time. As the steps (1) and (2) are performed at the same time, processing time may be very short and very superior process efficiency may be achieved.

The particle size of the porous carbon material may be controlled by controlling the mesh size of the sieve used in the step (2). The mesh size of the sieve may be 2.8-4 times of the target $D_{50}$ particle size of the porous carbon material, i.e., the $D_{50}$ particle size of the porous carbon material filtered through the sieve in the step (2) (2.8≤ mesh size/ target $D_{50}$≤ 4). When the mesh size of the sieve is limited as described above, the desired $D_{50}$ particle size of the porous carbon material may be achieved and a porous carbon material with a narrow particle size distribution may be obtained.

In one embodiment of the present disclosure, the target particle diameter $D_{50}$ of the porous carbon material can be, for example, the particle diameter $D_{50}$ of the porous carbon material manufactured according to one aspect of the present disclosure. For example, it can range from 10 μm to 100 μm, preferably between 20 μm and 80 μm, 20 μm and 70 μm, or 20 μm and 66 μm.

In general, a porous carbon material is filtered through the sieve only without performing centrifugal milling, the $D_{50}$ particle size of the filtered porous carbon material is about ½ of the mesh size of the sieve, and it is impossible to achieve a $D_{50}$ particle size smaller than ½ of the mesh size of the sieve. That is to say, in order to achieve the desired $D_{50}$ particle size of the porous carbon material, the mesh size of the sieve should be about 2 times or larger than the desired $D_{50}$ particle size of the porous carbon material. If the mesh size is smaller than 2 times, the desired $D_{50}$ particle size of the porous carbon material cannot be achieved. Since the porous carbon material is centrifugally milled in the step (1) and therefore the overall particle size of the porous carbon material is decreased, the minimum mesh size of the sieve may be 2.8 times of the desired $D_{50}$ particle size of the porous carbon material. And, if the mesh size exceeds 4 times, the particle size of the porous carbon material may not be controlled as desired. In addition, the mesh size of the sieve may be 60-700 µm, preferably 70-500 µm, more preferably 70-200 µm.

The porous carbon material filtered through the sieve in the step (2) may have a broadness factor (BF), that satisfies the following Equation 2, of 7 or lower.

$$\text{Broadness factor (BF)} = \text{(particle size } D_{90} \text{ of the porous carbon material)/(particle size } D_{10} \text{ of the porous carbon material)} \qquad \text{[Equation 2]}$$

Preferably, the porous carbon material filtered through the sieve may have BF of 1 to 6, more preferably larger than 1 and 6 or smaller ($1 < D_{90}/D_{10} \leq 6$).

This may mean that the finally prepared porous carbon material has a very narrow particle size distribution. If the ratio of the BF of the porous carbon material filtered through the sieve is 1 or smaller, specifically smaller than 1, the proportion of particles with a small particle size is too large. And, if it exceeds 6, the proportion of particles with a large particle size is too large, which may mean that the particle size distribution is very broad.

In addition, the $D_{10}$ to $D_{50}$ particle size standard deviation of the porous carbon material filtered through the sieve in the step (2) may be 1.5 µm or smaller. That is to say, according to the method for preparing a porous carbon material of the present disclosure, a porous carbon material with a desired $D_{50}$ particle size may be achieved and a very narrow particle size distribution may be achieved.

In the present specification, the $D_{10}$ to $D_{50}$ particle size standard deviation may refer to the standard deviation of the $D_{10}$, $D_{20}$, $D_{30}$, $D_{40}$ or $D_{50}$ particle size.

In an exemplary embodiment of the present disclosure, the $D_{50}$ particle size of the porous carbon material filtered through the sieve may be 100 µm or smaller, 90 µm or smaller, 80 µm or smaller or 70 µm or smaller. In one embodiment of the present disclosure, the particle diameter $D_{50}$ of the filtered porous carbon material through the sieve can be, for example, less than 10 µm, less than 15 µm, less than 18 µm, or less than 20 µm.

In addition, the tap density ($\rho_1$) of the porous carbon material filtered through the sieve in the step (2) may be the same as or lower than the tap density ($\rho_2$) of the porous carbon material before performing centrifugal milling in the step (1) ($\rho_1/\rho_2 \leq 1$). That is, the tap density of the porous carbon material may not be increased in the steps (1) and (2), which means that the particle size of the porous carbon material is controlled in the present disclosure without applying pressure to the porous carbon material.

The tap density refers to the apparent density of a powder measured by vibrating a container under a predetermined condition when filling the powder. In one embodiment of the present disclosure, the tap density can be measured after tapping the vessel containing the porous carbon material 1,000 times.

In one embodiment of the present disclosure, after step (2), an additional step (3) can be included, which involves collecting the porous carbon material that has passed through the sieve.

Accordingly, according to the method for preparing a porous carbon material having a controlled particle size of the present disclosure, a porous carbon material with the desired $D_{50}$ particle size and a very narrow particle size distribution can be obtained by controlling the mesh size of the sieve to be 2.8-4 times of the desired $D_{50}$ particle size of the porous carbon material. In addition, since the method involves a continuous process, process efficiency may be superior due to short preparation time and superior productivity may be achieved.

In another aspect, the present disclosure may provide a porous carbon material with a particle size controlled by the method described above.

The porous carbon material prepared according to the above-described method, as described, does not undergo chemical alteration beyond controlled particle size, thus it can contain numerous irregular pores on the surface and/or internally. Within these numerous surfaces and/or internal pores, sulfur-based materials can be encapsulated.

In one embodiment of the present disclosure, the porous carbon material prepared according to the above-described method possesses angular particle shapes.

In another aspect, the present disclosure may provide a sulfur-carbon composite including: the porous carbon material obtained by the method described above; and a sulfur-based material loaded onto all or at least some of inner pores and outer surfaces of the porous carbon material.

In an exemplary embodiment of the present disclosure, the sulfur-based material may be any material capable of providing sulfur ($S_8$) as an active material of a lithium-sulfur battery, without particular limitation. For example, the sulfur-based material includes one or more of sulfur ($S_8$) and a sulfur compound.

In an exemplary embodiment of the present disclosure, the sulfur-based material may include one or more selected from a group consisting of: inorganic sulfur ($S_8$), a disulfide compound including one or more of $Li_2S_n$ ($n \geq 1$), 2,5-dimercapto-1,3,4-thiadiazole and 1,3,5-trithiocyanuic acid; an organosulfur compound; and a carbon-sulfur polymer (($(C_2S_x)_n$, $2.5 \leq x \leq 50$, $n \geq 2$).

In an exemplary embodiment of the present disclosure, the sulfur-based material may be included in the sulfur-carbon composite by physical adsorption to the porous carbon material or by chemical bonding such as covalent bond, van deer Waals bond, etc. between sulfur (S) and carbon in the porous carbon material.

In an exemplary embodiment of the present disclosure, the content of the sulfur-based material may be specifically 60 wt % or higher or 70 wt % or higher based on 100 wt % of the sulfur-carbon composite. For example, the content of the sulfur-based material may be specifically 60-99 wt %, 70-99 wt %, 75-90 wt %, 70-85 wt %, 70-80 wt % or 70-75 wt % based on 100 wt % of the sulfur-carbon composite.

In the sulfur-carbon composite according to the present disclosure, the sulfur-based material is located inside the pores and/or on the outer surface of the carbon material, and may be present on less than 100%, specifically 1-95%, more specifically 60-90% of the entire inside pores and an external surface of the porous carbon material. When the amount of the sulfur loaded on the porous carbon material is within the above-described ranges, maximum effect may be exhibited in terms of electron transfer area and electrolyte wettability. Specifically, within the above-described ranges, the electron transfer area may be increased during charge and discharge since sulfur is thinly and evenly impregnated into the surface of the carbon material. If the amount of the sulfur on the surface of the porous carbon material exceeds 100%, the electrolyte wettability is decreased because the carbon material is completely covered with sulfur and it may not participate in reaction since electron is not transferred due to reduced contact with the conductive material included in the electrode.

The sulfur-carbon composite may be composited by simply mixing the sulfur-based material and the porous carbon material or may have a core-shell coating or supporting structure. The core-shell coating structure refers to a structure in which one of the sulfur-based material or the porous carbon material is coated with the other. For example, the surface of the carbon material may be coated with sulfur, or vice versa. And, the supporting structure may be a structure in which the sulfur-based material is filled inside, particularly in the inner pores, of the porous carbon material. The type of the sulfur-carbon composite is not specially limited as long as the content ratio of the sulfur and the carbon material described above is satisfied.

In an exemplary embodiment of the present disclosure, the sulfur-carbon composite may be used as a positive electrode active material and/or positive electrode additive of a lithium-sulfur battery, although the present disclosure is not limited thereto.

In another aspect, the present disclosure may provide a lithium-sulfur battery including: a positive electrode including the sulfur-carbon composite described above; a negative electrode; a separator disposed between the positive electrode and the negative electrode; and an electrolyte.

The positive electrode, the negative electrode, the separator and the electrolyte are not specially limited as long as they are those used in a lithium-sulfur battery.

Examples 1-5 and Comparative Example 3

Carbon nanotubes (MWCNT) were introduced into a centrifugal mill (RETSCH ZM200) equipped with a rotating teeth and a sieve, and milling and filtering of the carbon nanotubes were conducted while centrifugal force was applied to the carbon nanotubes, and collected the carbon nanotubes which passed through the sieve. The mesh size of the sieve, rpm and the angular velocity of the rotating teeth were controlled under the conditions described in Table 1 to achieve the desired $D_{50}$ particle size (target $D_{50}$) of the carbon nanotubes.

Comparative Example 4

Carbon nanotubes (MWCNT) were filtered through a sieve for control of particle size. The mesh size of the sieve was controlled under the condition described in Table 1 to achieve the desired $D_{50}$ particle size (target $D_{50}$) of the carbon nanotubes.

Comparative Example 5

A milled carbon nanotubes were obtained in the same manner as in Example 1 except that the carbon nanotubes (MWCNT) were introduced into a centrifugal mill (NETZSCH CSM80) not equipped with a sieve.

TABLE 1

| | Ex. 1 | Ex. 2 | Ex. 3 | Ex. 4 | Ex. 5 | Comp. Ex. 3 | Comp. Ex. 4 | Comp. Ex. 5 |
|---|---|---|---|---|---|---|---|---|
| Target $D_{50}$ | 20 μm | 27 μm | 35 μm | 65 μm | 22 μm | 72 μm | 35 μm | |
| Mesh size | 80 μm | 80 μm | 120 μm | 200 μm | 80 μm | 500 μm | 75 μm | — |
| rpm | 18000 | 14000 | 10000 | 6000 | 10000 | 10000 | — | 6000 |
| Angular velocity (rad/s) | 94.2 | 73.3 | 54.3 | 31.4 | 54.3 | 54.3 | — | 94.2 |

In an exemplary embodiment of the present disclosure, the positive electrode, which includes the sulfur-carbon composite described above, may be advantageous in that it exhibits high sulfur loading and, thus, improves electrochemical performance, although the effect of the present disclosure is not limited thereto.

EXAMPLES

Hereinafter, examples are presented to help understanding the present disclosure. However, the following examples merely illustrate the present disclosure and it will be obvious to those skilled in the art that various changes and modifications can be made within the scope and technical idea of the present disclosure and such changes and modifications fall within the scope of the appended claims.

<Preparation of Porous Carbon Materials>

Comparative Example 1

Carbon nanotubes (MWCNT) that had not been centrifugally milled were used without control of particle size.

Comparative Example 2

The carbon nanotubes (MWCNT) prepared in Comparative Example 1 were pulverized by jet milling.

Experimental Example 1. Measurement of Particle Size of Carbon Nanotubes

Figure 4:
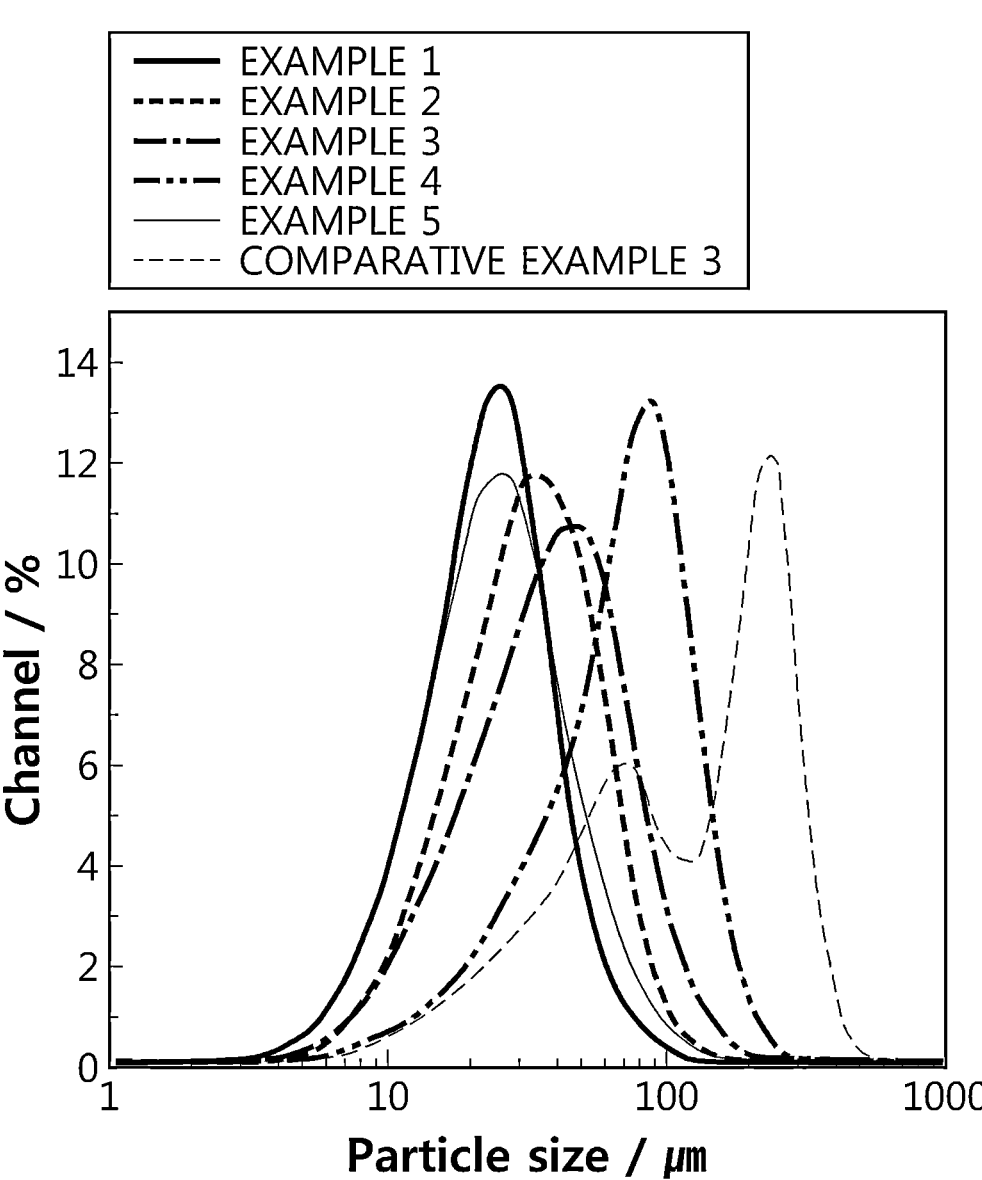
FIG. 4 is a graph showing the particle size distribution of porous carbon materials with a controlled particle size of Examples 1-5 and Comparative Example 3.
Figure 5:
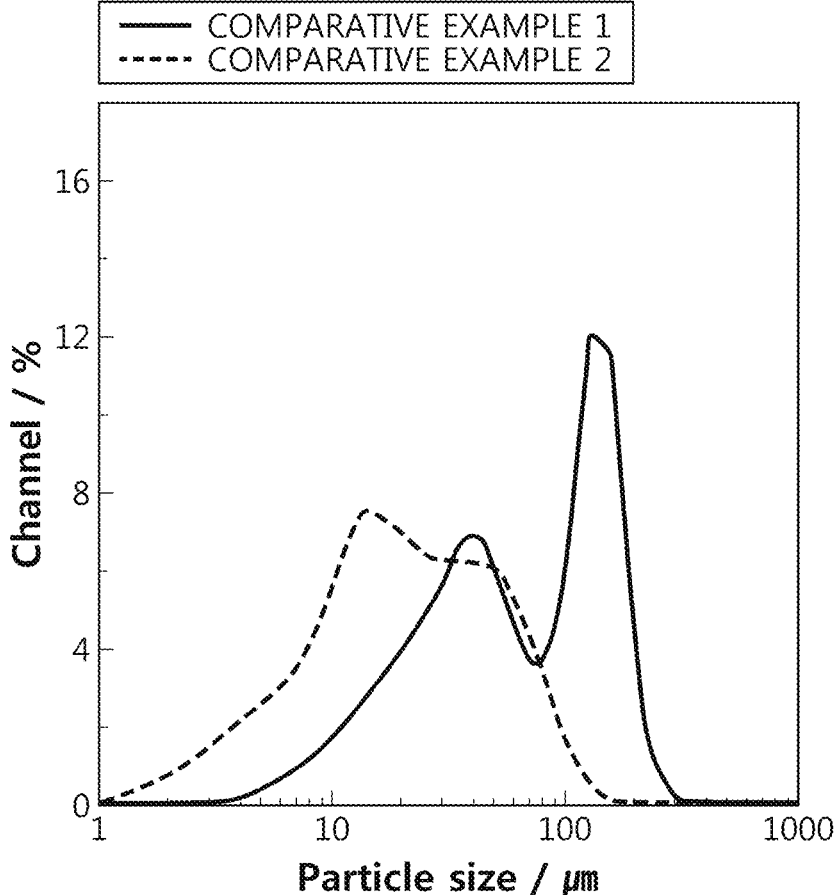
FIG. 5 is a graph showing the particle size distribution of a porous carbon material of Comparative Example 1 and a porous carbon material with a controlled particle size of Comparative Example 2.

The particle sizes of the centrifugally milled carbon nanotubes of Examples 1-5 and Comparative Examples 3 and 5, the carbon nanotubes of Comparative Example 1, the jet-milled carbon nanotubes of Comparative Example 2 and the sieve-filtered carbon nanotubes of Comparative Example 4 were measured using a dry particle size analyzer (Microtrac). The result is shown in Table 2, Table 3 and FIG. 4.

Because the applied force varies depending on the size of the centrifugal mill, the rpm value was decreased as the size of the centrifugal mill was larger in order to apply comparable force (whiling maintaining the angular velocity).

TABLE 2

| | Ex. 1 | Ex. 2 | Ex. 3 | Ex. 4 | Ex. 5 |
|---|---|---|---|---|---|
| Target $D_{50}$ | 20 μm | 27 μm | 35 μm | 65 μm | 22 μm |
| Mesh size | 80 μm | 80 μm | 120 μm | 200 μm | 80 μm |
| Mesh size/ target $D_{50}$ | 4 | 2.97 | 3.43 | 3.1 | 3.67 |
| rpm | 18000 | 14000 | 10000 | 6000 | 10000 |
| $D_{10}$ | 9 μm | 12 μm | 14 μm | 22 μm | 9 μm |
| $D_{20}$ | 13 μm | 17 μm | 19 μm | 34 μm | 14 μm |
| $D_{40}$ | 18 μm | 25 μm | 29 μm | 56 μm | 19 μm |
| $D_{50}$ | 20 μm | 28 μm | 35 μm | 66 μm | 22 μm |
| $D_{60}$ | 23 μm | 34 μm | 41 μm | 75 μm | 25 μm |
| $D_{70}$ | 27 μm | 39 μm | 49 μm | 85 μm | 32 μm |
| $D_{80}$ | 32 μm | 46 μm | 58 μm | 98 μm | 38 μm |

TABLE 2-continued

|  | Ex. 1 | Ex. 2 | Ex. 3 | Ex. 4 | Ex. 5 |
|---|---|---|---|---|---|
| $D_{90}$ | 41 μm | 57 μm | 73 μm | 118 μm | 61 μm |
| $D_{95}$ | 53 μm | 68 μm | 88 μm | 138 μm | 75 μm |
| $D_{99}$ | 98 μm | 92 μm | 128 μm | 184 μm | 105 μm |
| Broadness Factor $(D_{90}/D_{10})$ | 4.56 | 4.75 | 5.21 | 5.36 | 3.78 |
| $D_{10}$ to $D_{50}$ standard deviation (μm) | 0.06 | 0.4 | 0.62 | 1.2 | 0.81 |

TABLE 3

|  | Comp. Ex. 1 | Comp. Ex. 2 | Comp. Ex. 3 | Comp. Ex. 4 | Comp. Ex. 5 |
|---|---|---|---|---|---|
| Target $D_{50}$ | — | | 72 μm | 35 μm | |
| Mesh size | — | — | 500 μm | 75 μm | — |
| Mesh size/ target $D_{50}$ | — | — | 6.94 | 2.14 | — |
| rpm | — | — | 10000 | — | 6000 |
| $D_{10}$ | 25 μm | 11 μm | 23 μm | 12 μm | 7 μm |
| $D_{20}$ | 42 μm | 17 μm | 36 μm | 17 μm | 12 μm |
| $D_{40}$ | 69 μm | 31 μm | 59 μm | 28 μm | 24 μm |
| $D_{50}$ | 93 μm | 41 μm | 72 μm | 35 μm | 29 μm |
| $D_{60}$ | 149 μm | 53 μm | 85 μm | 43 μm | 34 μm |
| $D_{70}$ | 184 μm | 69 μm | 101 μm | 53 μm | 40 μm |
| $D_{80}$ | 211 μm | 90 μm | 119 μm | 63 μm | 47 μm |
| $D_{90}$ | 241 μm | 116 μm | 143 μm | 78 μm | 61 μm |
| $D_{95}$ | 268 μm | 138 μm | 164 μm | 92 μm | 76 μm |
| $D_{99}$ | 356 μm | 184 μm | 213 μm | 129 μm | 123 μm |
| Broadness Factor $(D_{90}/D_{10})$ | 9.64 | 10.37 | 9.3 | 6.5 | 17.57 |
| $D_{10}$ to $D_{50}$ standard deviation (μm) | 10 | 0.72 | 3.6 | 1.57 | >10 |

As seen from TABLE 2 and TABLE 3, the carbon nanotubes showed a particle size the same as or similar to the desired $D_{50}$ particle size when the mesh size of the sieve was 2.8-4 times of the desired $D_{50}$ particle size of the carbon nanotubes (Examples 1-5). In addition, the Broadness Factor of the carbon nanotubes was 7 or lower, or larger than 1 and 6 or lower, and the $D_{10}$ to $D_{50}$ standard deviation of the carbon nanotubes was 1.5 or smaller.

From these results, it can be seen that the desired $D_{50}$ particle size of the porous carbon material can be achieved by the method for preparing a porous carbon material of the present disclosure and a very narrow particle size distribution can be achieved.

In contrast, for the carbon nanotubes of Comparative Example 1, which had not been milled, the Broadness Factor was 9.64. In addition, the $D_{10}$ to $D_{50}$ standard deviation of the carbon nanotube was very large as 10, indicating that the particle size of the carbon nanotube was not controlled appropriately and a carbon nanotube with a very nonuniform particle size was prepared.

For Comparative Example 2, wherein jet milling was performed instead of centrifugal milling, the $D_{10}$ to $D_{50}$ standard deviation of the carbon nanotube was low as 0.72 but the Broadness Factor was 10.37 due to nonuniform pulverization. That is to say, although a relatively narrow $D_{10}$ to $D_{50}$ particle size distribution was achieved, the Broadness Factor of the porous carbon material of Comparative Example 2 was much higher than that of Examples 1-5, suggesting that the overall particle size distribution was broad and the carbon nanotubes were not pulverized uniformly.

In Comparative Example 3, the carbon nanotube was centrifugally ground and filtered through the sieve for controlling of particle size. The mesh size of the sieve was 6.94 times of the desired $D_{50}$ particle size of the carbon nanotube. Although the desired $D_{50}$ particle size could be achieved, the Broadness Factor was 9.3 and the $D_{10}$ to $D_{50}$ standard deviation of the carbon nanotubes were 3.6. That is, the carbon nanotubes of Comparative Example 3 had a nonuniform particle size with a broad particle size distribution. Through this, it can be seen that the desired $D_{50}$ particle size of the carbon nanotubes can be achieved, and the particle size can be controlled with a very narrow particle size distribution when the mesh size of the sieve is 2.8-4 times of the desired $D_{50}$ particle size of the carbon nanotubes.

In Comparative Example 4, the carbon nanotubes were filtered through the sieve only, without centrifugal milling. In general, the $D_{50}$ particle size of the carbon nanotubes filtered through the sieve only is about ½ of the mesh size of the sieve. For Comparative Example 4, the desired $D_{50}$ particle size of the carbon nanotubes could be achieved because the mesh size of the sieve was 2.14 times of desired $D_{50}$ particle size of the carbon nanotubes. However, because the centrifugal milling was not performed, while the Broadness Factor was 6.5 but the $D_{10}$ to $D_{50}$ standard deviation was 1.57, indicating that the carbon nanotubes of Comparative Example 4 have a nonuniform particle size with a broad particle size distribution. In addition, the yield was low.

For Comparative Example 5, wherein centrifugal milling was performed only without filtering through the sieve, the carbon nanotubes showed a large $D_{10}$ to $D_{50}$ standard deviation and large deviation in particle size (high BF).

Accordingly, it can be seen that a porous carbon material with a narrow particle size distribution can be obtained by centrifugally milling a porous carbon material and filtering the same through a sieve having a mesh size of 2.8-4 times of the desired $D_{50}$ particle size of the porous carbon material.

Experimental Example 2: Evaluation of Tap Density Before and After Particle Size Control Entangled multi-walled carbon nanotubes (MWCNTs) (Cnano, tap density 0.14 g/cm$^3$, particle shape uniformity 1.52) were prepared. Subsequently, the entangled carbon nanotubes were milled using a centrifugal mill (Retsch ZM200) at 18,000 rpm, and filtered using an 80 μm mesh sieve to obtain a modified carbon nanotubes.

The modified porous carbon nanotubes exhibited a tap density of 0.07 g/cm$^3$ when tapped 1,000 times, and the particle shape uniformity was measured as 1.07. Here, the tap density was measured according to ASTM B527-06 by utilizing TAP-25 (LOGAN). The particle shape uniformity represents a ratio of the diameter of the circumscribed circle to the diameter of the inscribed circle of the particle, and was calculated as the average value of the ratio of five randomly selected particles.

This demonstrates that the porous carbon material prepared according to the method according to the present disclosure can effectively modify particle shapes uniformly without increasing tap density before and after controlling particle sizes.

Experimental Example 3. Comparative Evaluation of Surface Properties According to Particle Size Control Methods SEM images of each of the porous carbon material prepared in Comparative Example 2 and the porous carbon material prepared in Example 1 are shown in FIG. 6. The SEM image on the left shows the porous carbon material of Comparative Example 2, and the SEM image on the right shows the porous carbon material of Example 1.

Referring to FIG. 6, it was confirmed that the surface of the porous carbon material pulverized by the jet mill was relatively flat, whereas the surface of the porous carbon material milled by the centrifugal mill was relatively rough and had an angular particle shape.

From this, it was inferred that the porous carbon material having a controlled particle diameter according to an aspect of the present disclosure has low tap density and excellent particle shape uniformity characteristics due to its surface characteristics.

Although the present disclosure has been hereinabove described with regard to a limited number of embodiments and drawings, the present disclosure is not limited thereto, and it is obvious to those skilled in the art that various changes and modifications may be made thereto within the technical aspect of the present disclosure and the appended claims and equivalents thereof.

What is claimed is:

1. A method for preparing a sulfur-carbon composite, comprising:

preparing a porous carbon material having a $D_{50}$ particle size of 20 μm to 100 μm, comprising:

(1) a step of centrifugally milling a porous carbon material with a centrifugal mill; and (2) a step of filtering the centrifugally milled porous carbon material through a sieve, wherein the steps (1) and (2) are performed at the same time, wherein a mesh size of the sieve is 2.8 to 4 times of the $D_{50}$ particle size of the porous carbon material filtered through the sieve in the step (2), wherein the porous carbon material filtered through the sieve in the step (2) has a broadness factor (BF) of 7 or lower, and wherein the broadness factor (BF) satisfies Equation 1:

Broadness factor (BF)=(particle size $D_{90}$ of the porous carbon material after the step (2))/particle size $D_{10}$ of the porous carbon material after the step (2)), and [Equation 1]

loading a sulfur-based material onto all or at least some of inner pores and outer surfaces of the porous carbon material, wherein the porous carbon material comprises carbon nanotubes.

2. The method for preparing a sulfur-carbon composite according to claim 1, wherein the step (1) comprises a process of centrifugally milling the porous carbon material at 6,000-23,000 rpm.

3. The method for preparing a sulfur-carbon composite according to claim 1, wherein the step of preparing the porous carbon material further comprises:

(3) a step of collecting the porous carbon material which passed through the sieve after the step (2).

4. The method for preparing a sulfur-carbon composite according to claim 1, wherein the step (1) and the step (2) are performed by utilizing the centrifugal mill including the sieve and a plurality of rotating teeth, and wherein, in the step (1), the porous carbon material is milled by contacting the plurality of rotating teeth in the centrifugal mill.

5. The method for preparing a sulfur-carbon composite according to claim 4, wherein an angular velocity of the rotating teeth is 30 to 125 rad/s.

6. The method for preparing a sulfur-carbon composite according to claim 1, wherein the porous carbon material further comprises one or more selected from the group consisting of carbon nanotube, carbon black, carbon nanofiber, graphene, graphite and activated carbon.

7. The method for preparing a sulfur-carbon composite according to claim 1, wherein a $D_{10}$ to $D_{50}$ particle size standard deviation of the porous carbon material filtered through the sieve in the step (2) is 1.5 μm or smaller.

8. The method for preparing a sulfur-carbon composite according to claim 1, wherein a tap density of the porous carbon material filtered through the sieve in the step (2) is the same as or lower than the tap density of the porous carbon material before performing centrifugal milling in the step (1), and wherein the tap density is measured after tapping a vessel containing the porous carbon material 1000 times.

9. A sulfur-carbon composite prepared according to the method of claim 1.

10. A lithium-sulfur battery comprising:

a positive electrode comprising the sulfur-carbon composite according to claim 9;

a negative electrode;

a separator disposed between the positive electrode and the negative electrode; and an electrolyte.

11. The sulfur-carbon composite according to claim 9, wherein a $D_{10}$ to $D_{50}$ particle size standard deviation of the porous carbon material is 1.5 μm or smaller.

\* \* \* \* \*